April 27, 1943.  L. L. MELLOR  2,317,790
OPTICAL SYSTEM
Filed March 1, 1941
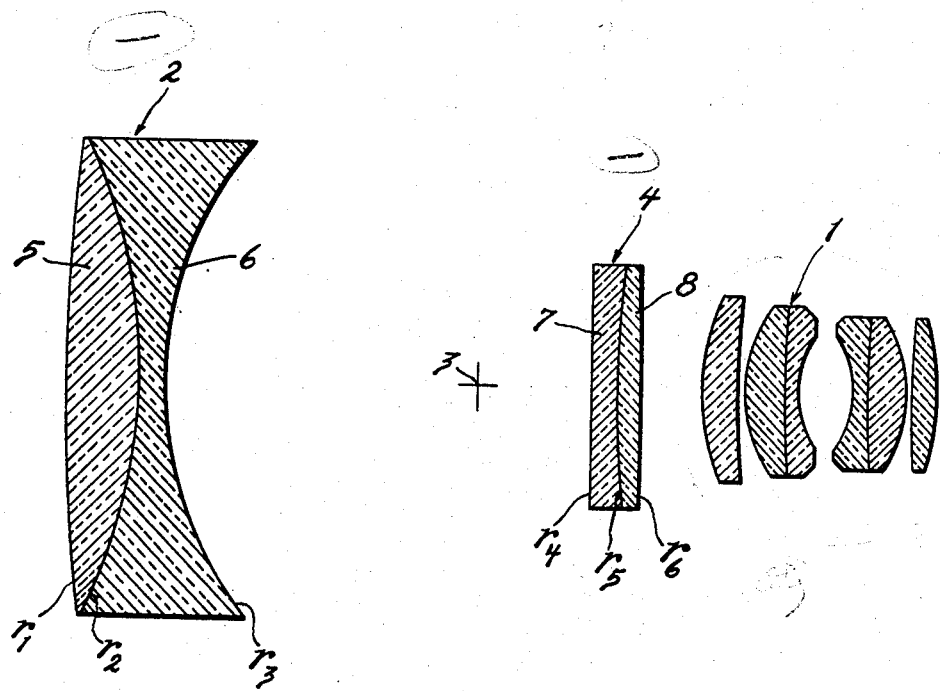
INVENTOR
LEWIS L. MELLOR
BY
ATTY.

Patented Apr. 27, 1943

2,317,790

UNITED STATES PATENT OFFICE 2,317,790

OPTICAL SYSTEM

Lewis L. Mellor, Evanston, Ill., assignor to The Bell & Howell Company, Chicago, Ill., a corporation of Illinois Application March 1, 1941, Serial No. 381,345

7 Claims. (Cl. 88—57)

My invention relates particularly to the art of photographic color motion pictures of the additive or plural image type involving a plural image forming device, such as a prism set, arranged between an objective lens and its focal plane and requiring considerable space between the objective lens and its focal plane, although not limited to this use alone.

It is usual to meet the above requirement by placing a supplementary lens or lens combination of negative characteristics in front of a positive objective lens of usual or standard short focus characteristics whereby, as compared with the objective alone, to decrease the equivalent focal length of the system a larger percentage than the back focal length, thereby affording a relatively long back focus to provide greater space between the objective and the focal plane.

Objects of my invention reside in the provision of an optical system affording a relatively long back focus for the instant purpose of meeting the above requirement which provides for effective minimization of aberration and distortion, particularly chromatic and barrel-shaped distortion, which is readily adaptable to provide different equivalent focal lengths while maintaining a given back focus and while using the same positive objective and which in its adaptability does not require undesirably long axial distance and consequent undesirably large lens diameter.

The accompanying drawing, forming a part hereof, is an axial section of a photographic lens system embodying a typical form of my invention.

Referring to the drawing, I designates generally a usual positive photographic objective having for the purpose of illustration a focus of 35 mm.

The negative lens combination of my invention is spaced forwardly from the objective and consists of a negative lens 2 of relatively strong power positioned outwardly from the first principal focus 3 of the objective and a second negative lens 4 of relatively extremely weak power disposed between and spaced from the objective I and the negative lens 2 and positioned inwardly of the first principal focus of the objective.

The lens 2 consists of different positive and negative elements 5 and 6 having their facing surfaces, as designed at $r_2$, cemented together. One exterior surface $r_1$ of the lens 2 is convex and directed away from the objective and the other exterior surface $r_3$ thereof is concave and directed toward the objective, the radius of the convex surface $r_1$ being greater than three and one-half times the radius of the concave surface $r_3$ and as shown in the order of five to one.

The lens 4 consists of different negative and positive elements 7 and 8 having their facing surfaces, as designated at $r_5$, cemented together.

The negative lens combination, consisting of the lenses 2 and 4, has a back focus greater than its focal length by at least ten per cent of its focal length, as shown approximately 30 per cent, and is corrected for chromatic difference of focus and of magnification, and is constructed as follows:

NEGATIVE LENS COMBINATION

| | |
|---|---|
| Focal length mm__ | 108.03 |
| Back focus mm__ | 150.2 |

NEGATIVE LENSES

*Focal length*

| | |
|---|---|
| 2 mm__ | 111.844 |
| 4 mm__ | 4204.1 |

*Power*

| | |
|---|---|
| 2 diopters__ | 8.94102 |
| 4 do____ | .237863 |

AXIAL THICKNESS OF ELEMENTS

| | |
|---|---|
| 5 mm__ | 7.6 |
| 6 mm__ | 2.5 |
| 7 mm__ | 2.5 |
| 8 mm__ | 2.5 |

RADII OF CURVATURE OF SURFACES

| | |
|---|---|
| $r_1$ mm__ | 190.50 |
| $r_2$ mm__ | 52.55 |
| $r_3$ mm__ | 36.83 |
| $r_4$ | ∞ |
| $r_5$ mm__ | 92.708 |
| $r_6$ mm__ | 690.20 |

| | |
|---|---|
| Air space between 2 and 4 mm__ | 42.8 |
| Air space between 4 and I mm__ | 6.0 |

The second negative lens 4, positioned between the positive objective I and the first principal focus 3 thereof, is of extremely weak power as compared to the power of the negative lens 2, positioned forwardly of the first principal focus 3 of the positive objective, as will be observed from the focal lengths and dioptric powers of the lenses 2 and 4 above set forth, and, by reason of its extreme weakness, the lens 4 is capable of correction to a high degree for chromatic difference of focus and of magnification of at least the negative lens combination without accompanying distortion and is so corrected, this permitting a comparatively compact design of the negative lens combination by reason of the fact that the design of the lens 2 is correspondingly relieved of the color correction factor. The power of the lens 2 exceeds that of the lens 4 in the order of at least fifteen to one, as shown 37.58 to 1.

Accordingly, the negative lens combination—providing for effective minimization of aberration and distortion, particularly chromatic and barrel-shaped distortion, the relatively extremely weak rear lens 4 correcting what cannot be corrected by the front lens 2, and the negative lens combination preferably correcting for the entire glass path including the positive objective 1 and a plural image forming prism set arranged between the objective and its focal plane—effects a relatively long back focus and is readily adaptable to provide different equivalent focal lengths while maintaining a given back focus and while using the same positive objective, and in its adaptability does not require undesirably long axial distance and consequent undesirably large lens diameter.

While I have thus described my invention, I do not wish to be limited to the precise details described, as changes may be readily made without departing from the spirit of my invention, but having thus described my invention, I claim as new and desire to secure by Letters Patent the following:

1. In an optical system, the combination with a positive objective, of a negative lens combination spaced from the objective and comprising a negative lens of relatively strong power and consisting of different positive and negative elements and having one surface convex and directed away from the objective and having another surface thereof concave and directed toward the objective, the radius of the convex surface being greater than three and one-half times the radius of the concave surface, and a second negative lens of relatively weak power and disposed between and spaced from said first mentioned negative lens and the objective, the power of said first mentioned negative lens exceeding that of said second negative lens in the order of at least fifteen to one, said second negative lens being corrected for chromatic difference of focus and of magnification of at least said negative lens combination.

2. In an optical system, the combination with a positive objective, of a negative lens combination spaced from the objective and comprising a negative lens of relatively strong power and positioned outwardly from the first principal focus of the objective and consisting of different positive and negative elements and having one surface convex and directed away from the objective and having another surface concave and directed toward the objective, the radius of the convex surface being greater than three and one-half times the radius of the concave surface, and a second negative lens of relatively weak power and disposed between and spaced from said first mentioned negative lens and the objective and positioned inwardly of the first principal focus of the objective, the power of said first mentioned negative lens exceeding that of said second negative lens in the order of at least fifteen to one, said second negative lens being corrected for chromatic difference of focus and of magnification of at least said negative lens combination.

3. In an optical system, the combination with a positive objective, of a negative lens combination spaced from the objective and comprising a negative lens of relatively strong power and positioned outwardly from the first principal focus of the objective and consisting of different positive and negative elements and having one surface convex and directed away from the objective and having another surface concave and directed toward the objective, the radius of the convex surface being greater than three and one-half times the radius of the concave surface, and a second negative lens of relatively extremely weak power consisting of different positive and negative elements and disposed between the first mentioned negative lens and the objective and positioned inwardly of the first principal focus of the objective, said second negative lens being corrected for chromatic difference of focus and of magnification of at least said negative lens combination.

4. In an optical system, the combination with a positive objective, of a negative lens combination spaced from the objective and comprising a negative lens of relatively strong power and spaced from the objective a distance greater than the focal length of the objective and consisting of different positive and negative elements and having one surface convex and directed away from the objective and having another surface concave and directed toward the objective, the radius of the convex surface being greater than the radius of the concave surface in the order of five to one, and a second negative lens of relatively extremely weak power and disposed between and spaced from said first mentioned negative lens and the objective, said second negative lens being corrected for chromatic difference of focus and of magnification of at least said negative lens combination.

5. In an optical system, the combination with a positive objective, of a negative lens combination spaced from the objective and comprising a negative lens of relatively strong power and positioned outwardly from the first principal focus of the objective and consisting of different positive and negative elements cemented together and having one surface convex and directed away from the objective and having another surface concave and directed toward the objective, the radius of the convex surface being greater than the radius of the concave surface in the order of five to one, and a second negative lens of relatively extremely weak power consisting of different positive and negative elements cemented together and disposed between the first mentioned negative lens and the objective and positioned inwardly of the first principal focus of the objective, said second negative lens being corrected for chromatic difference of focus and of magnification of at least said negative lens combination.

6. In an optical system, the combination with a positive objective, of a negative lens combination spaced forwardly from the objective and comprising a negative lens of relatively strong power and consisting of different positive and negative elements and having one surface convex and directed away from the objective and having another surface thereof concave and directed toward the objective, the radius of the convex surface being greater than three and one-half times the radius of the concave surface, and a second negative lens of relatively extremely weak power and disposed between and spaced from said first mentioned negative lens and the objective, said negative lens combination having a back focus greater than its focal length by at least ten per cent of its focal length, said second negative lens being corrected for chromatic difference of focus and of magnification of at least said negative lens combination.

7. In an optical system, the combination with a positive objective, of a negative lens combination spaced from the objective and comprising a negative lens of relatively strong power and positioned outwardly from the first principal focus of the objective and consisting of different positive and negative elements cemented together and having one surface convex and directed away from the objective and having another surface concave and directed toward the objective, the radius of the convex surface being greater than the radius of the concave surface in the order of five to one, and a second negative lens of relatively weak power and consisting of different positive and negative elements cemented together and disposed between the first mentioned negative lens and the objective and positioned inwardly of the first principal focus of the objective, said negative lens combination having a back focus greater than its focal length by at least ten per cent of its focal length, the power of said first mentioned negative lens exceeding that of said second negative lens in the order of at least fifteen to one, said second negative lens being corrected for chromatic difference of focus and of magnification of at least said negative lens combination.

LEWIS L. MELLOR.